United States Patent
Sykora

(10) Patent No.: US 9,663,068 B1
(45) Date of Patent: May 30, 2017

(54) RODENT BAIT SYSTEM FOR USE WITH A VEHICLE

(71) Applicant: George John Sykora, Chehalis, WA (US)

(72) Inventor: George John Sykora, Chehalis, WA (US)

( * ) Notice: Subject to any disclaimer, the term of this patent is extended or adjusted under 35 U.S.C. 154(b) by 0 days.

(21) Appl. No.: 15/384,014

(22) Filed: Dec. 19, 2016

Related U.S. Application Data

(63) Continuation-in-part of application No. 14/878,927, filed on Oct. 8, 2015, now abandoned.

(51) Int. Cl.
*A01M 25/00* (2006.01)
*B60R 99/00* (2009.01)

(52) U.S. Cl.
CPC ........ *B60R 99/00* (2013.01); *B60R 2099/005* (2013.01)

(58) Field of Classification Search
USPC .......................................................... 43/131
See application file for complete search history.

(56) References Cited

U.S. PATENT DOCUMENTS

| | | | | |
|---|---|---|---|---|
| 4,400,904 | A * | 8/1983 | Baker | A01M 25/004 119/52.4 |
| 4,746,033 | A * | 5/1988 | Morellini | A01M 25/00 222/129 |
| 6,671,999 | B1 * | 1/2004 | Doucette | A01M 1/2011 43/131 |

* cited by examiner

*Primary Examiner* — Richard G Davis
(74) *Attorney, Agent, or Firm* — Plager Schack LLP

(57) ABSTRACT

A rodent bait system for use with a vehicle to prevent rodents from entering an interior of the vehicle includes a base assembly having tubular members coupled together by connecting joints, the base assembly being disposed on a ground surface such that the tubular members and connecting joints conform around a tire of the vehicle, the tubular members having at least one entryway for permitting a rodent to enter the base assembly, a housing assembly coupled to a tee coupling of the base assembly, a pair of rods coupled to an interior wall of the tee coupling, and a bait member disposed within the housing assembly and supported by the pair of rods. The rodent enters the entryway of the base assembly and is directed along an interior path defined by any number of the tubular members and connecting joints to permit the rodent access to the bait member.

8 Claims, 9 Drawing Sheets

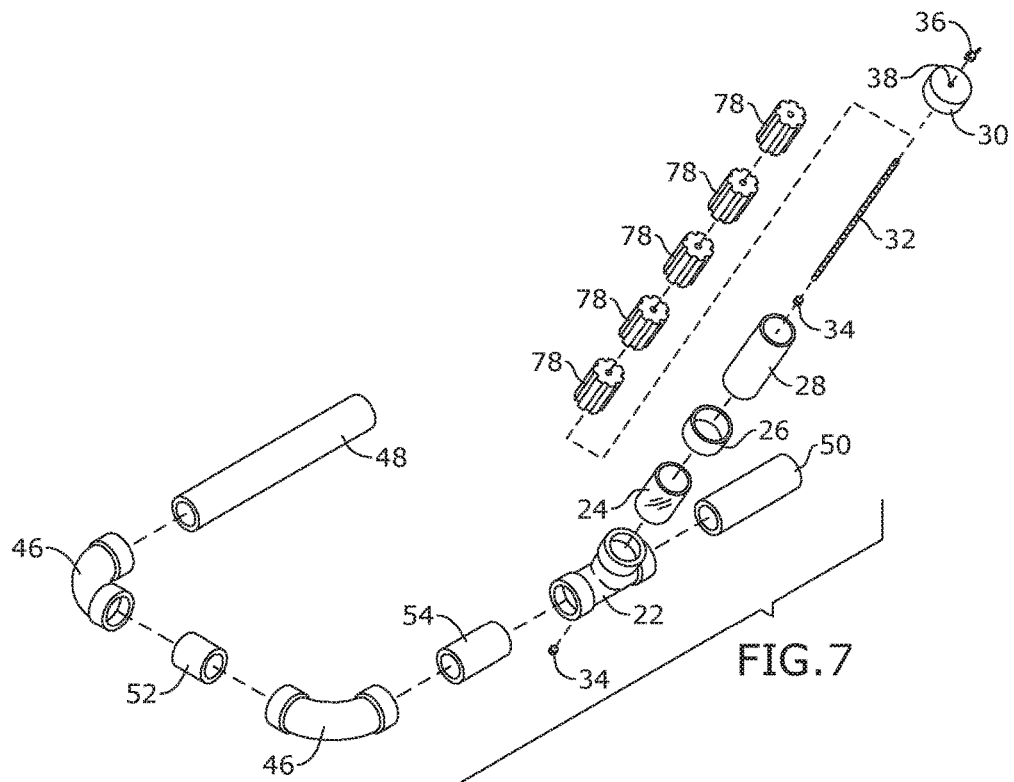
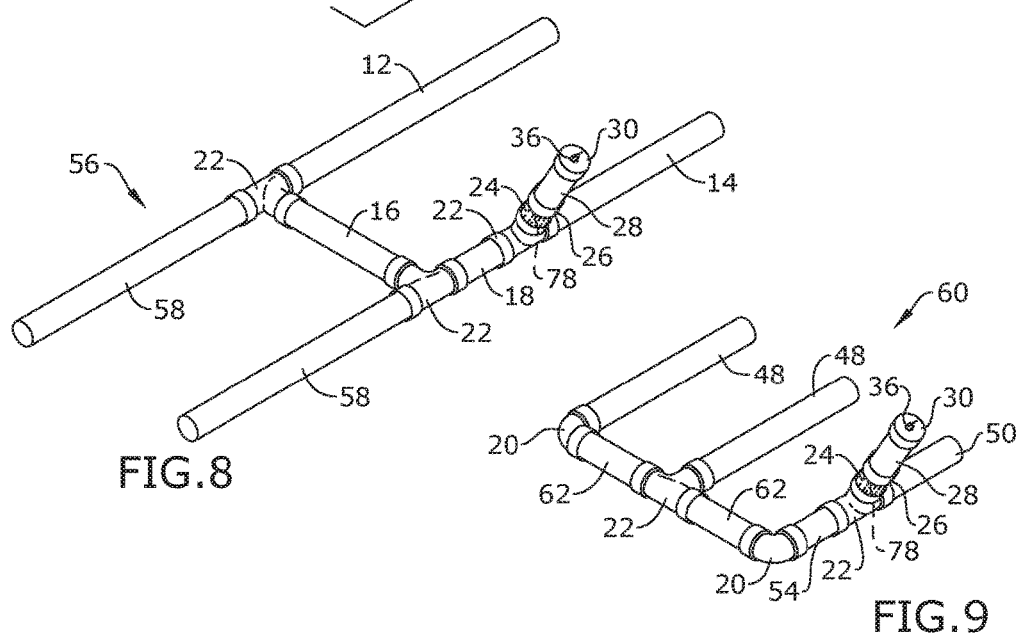

RODENT BAIT SYSTEM FOR USE WITH A VEHICLE

RELATED APPLICATION

The application claims priority to non-provisional patent application U.S. Ser. No. 14/878,927 filed on Oct. 8, 2015, the entire contents of which is herein incorporated by reference.

BACKGROUND

The embodiments herein relate generally to rodent bait systems.

Vehicles such as cars, trucks, motorcycles and airplanes are often parked outside, sometimes for extended periods of time in long-term storage. This is problematic because rodents residing outdoors often climb into entry points of the vehicle such as the tires and enter the vehicle's interior and/or engine compartment. As a result, these rodents can damage the vehicle by gnawing on electrical wires and/or contaminating interior compartments with feces. There do not exist any rodent bait stations that are designed for use with vehicles stored in an outdoor environment.

As such, there is a need in the industry for a rodent bait system for use with different types of vehicles, which addresses the limitations of the prior art and protects these vehicles from damage. Specifically, there is a need for a rodent bait system that diverts rodents away from common entry points of the vehicle proximate the tires.

SUMMARY

A rodent bait system for use with a vehicle to prevent rodents from entering an interior portion of the vehicle is provided. The rodent bait system comprises a base assembly comprising a plurality of tubular members coupled together by connecting joints, the base assembly configured to be disposed on a ground surface and oriented such that the plurality of tubular members and connecting joints conform around at least one tire of the vehicle, the plurality of tubular members comprising at least one entryway for permitting a rodent to enter the base assembly, a housing assembly coupled to the base assembly and comprising a plurality of secondary tubular members coupled together, a first end of the secondary tubular members being coupled to a tee coupling of the base assembly and a second end of the secondary tubular members comprising a cap detachably coupled thereto, a pair of rods coupled to an interior wall of the tee coupling, and a bait member disposed within the housing assembly and supported by the pair of rods, wherein the rodent enters the entryway of the base assembly and is directed along an interior path defined by any number of the tubular members and connecting joints to permit the rodent to access the bait member.

BRIEF DESCRIPTION OF THE FIGURES

The detailed description of some embodiments of the invention will be made below with reference to the accompanying figures, wherein the figures disclose one or more embodiments of the present invention.

FIG. 7 depicts an exploded view of an alternative embodiment of the rodent bait system;

FIG. 8 depicts a perspective view of an alternative embodiment of the rodent bait system;

FIG. 9 depicts a perspective view of an alternative embodiment of the rodent bait system;

DETAILED DESCRIPTION OF CERTAIN EMBODIMENTS

Figure 1:
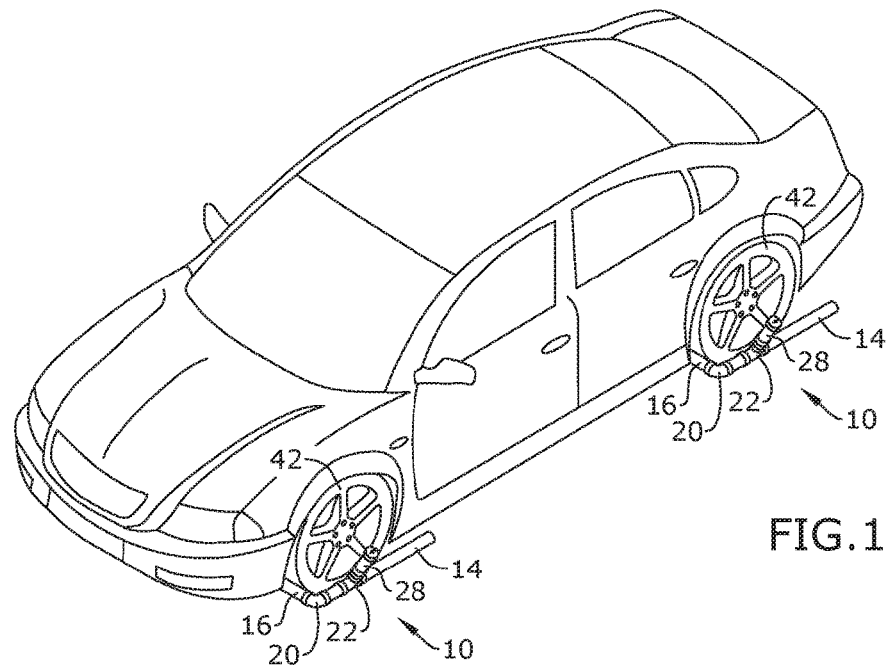
FIG. 1 depicts a perspective view of certain embodiments of the rodent bait system shown in use.
Figure 2:
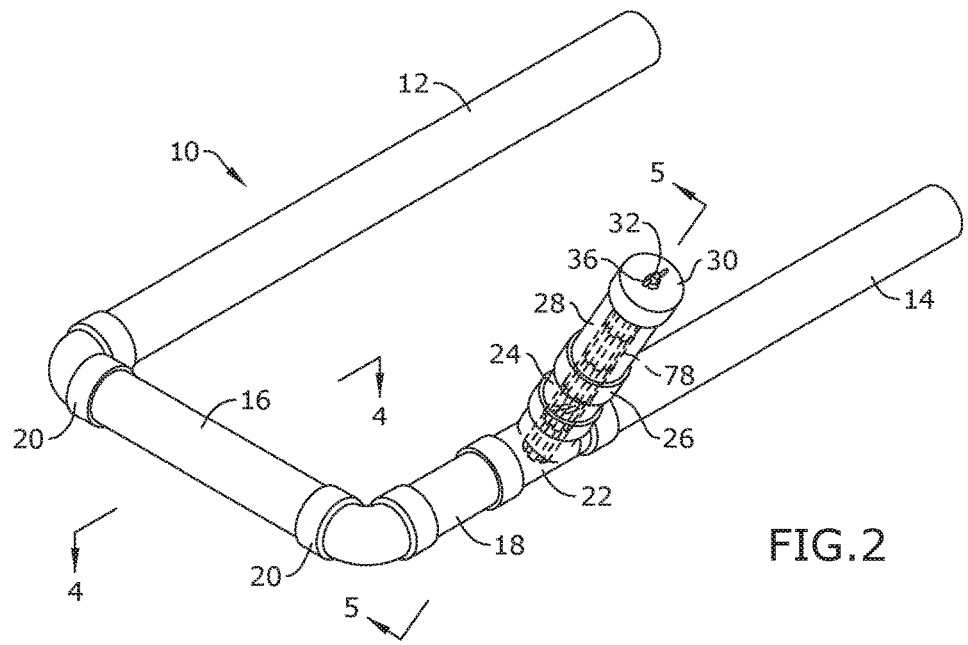
FIG. 2 depicts a perspective view of certain embodiments of the rodent bait system.
Figure 3:
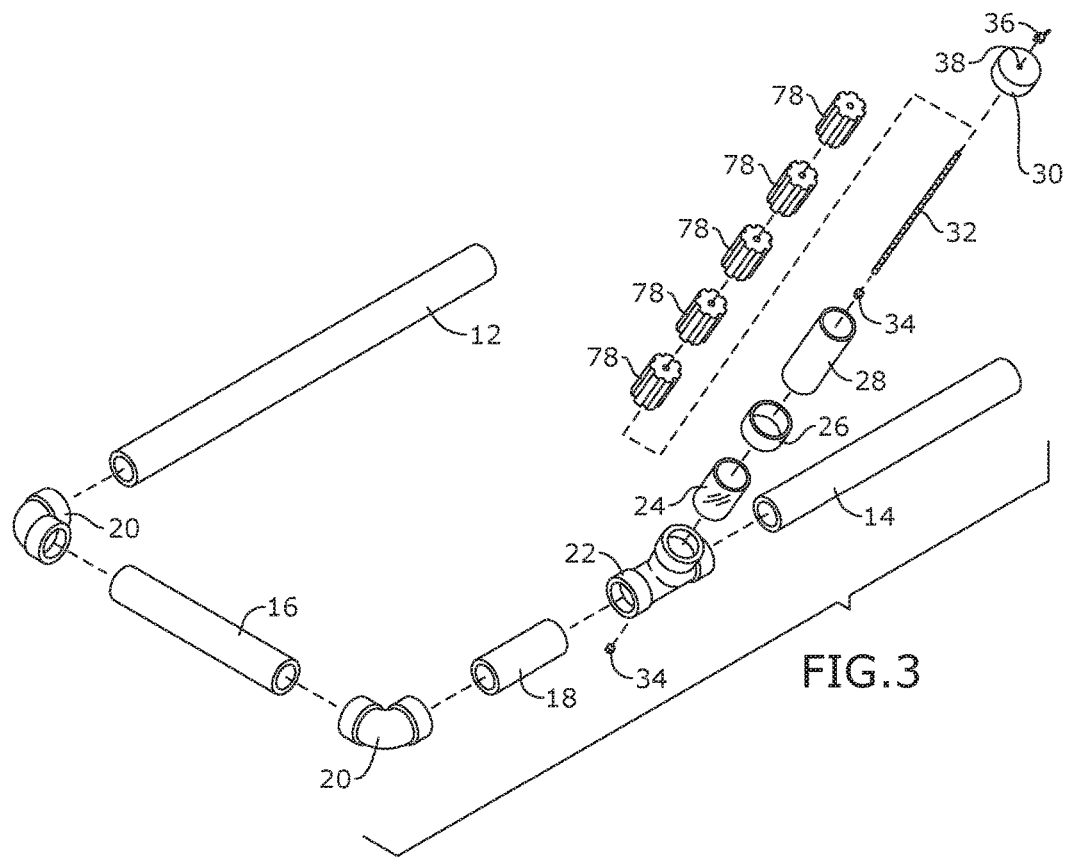
FIG. 3 depicts an exploded view of certain embodiments of the rodent bait system.
Figure 4:
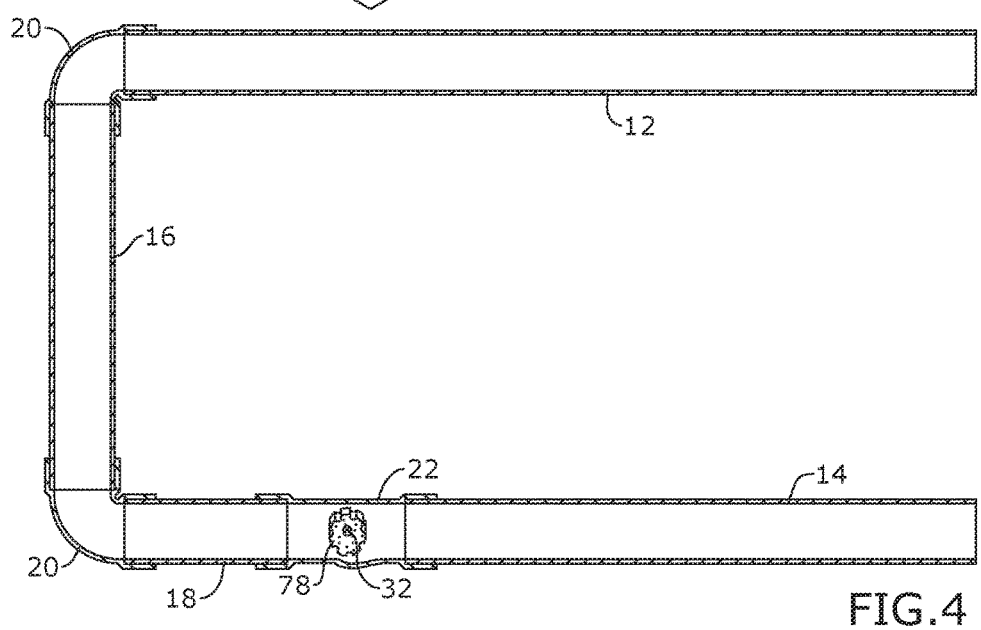
FIG. 4 depicts a section view of certain embodiments of the rodent bait system taken along line 4-4 in FIG. 2.

As depicted in FIGS. 1-4, rodent bait system 10 is configured for use with a vehicle to divert a rodent's attention away from common entry points of the vehicle near the tires. This prevents the rodent from entering the vehicle's interior such as an engine compartment and/or other compartment (not shown) and causing damage to the vehicle. Rodent bait system 10 is disposed on the ground and around at least one tire 42 of the vehicle. Although the figures depict rodent bait system 10 for use with a car, it shall be appreciated that the system may be used with any type of vehicle having one or more tires including, but not limited to, other cars, trucks, motorcycles, recreational vehicles, trailers, all-terrain vehicles, snow mobiles, airplanes, or the like, regardless of whether these vehicles have single or multiple axles.

Rodent bait system 10 generally comprises a plurality of tubular members, connecting joints and a housing assembly to store one or more bait blocks 78. As will be apparent in the following disclosure, rodent bait system 10 may have a variety of configurations to accommodate different vehicle types and sizes.

In one exemplary embodiment, the system comprises tubular members and connecting joints coupled together including long entry tube 12, short entry tube 14, end tube 16, corner tube 18, corner elbows 20 and tee coupling 22. Tee coupling 22 is coupled to corner tube 18, short entry tube 14, and a housing assembly. The housing assembly comprises transparent bait tube 24, bait tube coupling 26 and straight bait tube 28 secured together. Specifically, transparent bait tube 24 is coupled to tee coupling 22 and straight bait tube 28 is coupled to transparent bait tube 24 by bait tube coupling 26. In an alternative embodiment, straight bait tube 28 may be transparent.

Figures 5, 6:
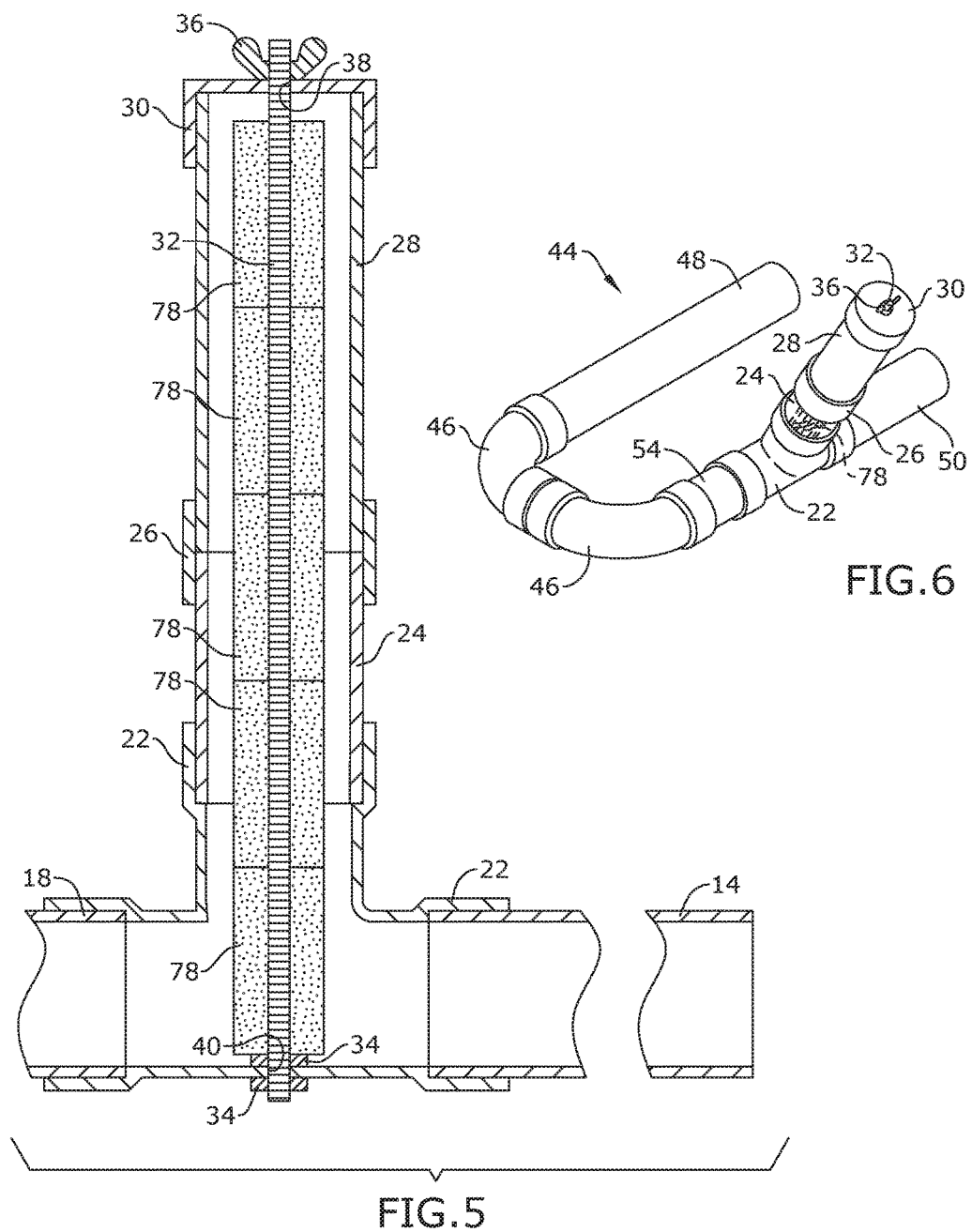
FIG. 5 depicts a section view of certain embodiments of the rodent bait system taken along line 5-5 in FIG. 2.
FIG. 6 depicts a perspective view of an alternative embodiment of the rodent bait system.

Cap 30 is detachably coupled to the top end of straight bait tube 28. As depicted in FIG. 5, threaded rod 32 is disposed through upper rod hole 38 of cap 30 and lower rod hole 40 of tee coupling 22. Threaded rod 32 is secured to cap 30 by wing nut 36 and tee coupling 22 by a pair of hex nuts 34. Since threaded rod 32 is positioned along the longitudinal axis of the housing assembly, any number of bait blocks 78 can be slidably mounted thereto. Bait blocks 78 may be any type of bait and/or rodenticide known in the field.

In operation, the components of rodent bait system 10 are assembled as described above. Cap 30 is removed from threaded rod 32 and straight bait tube 28 by loosening wing nut 36. Any number of bait blocks 78 are slidably mounted to threaded rod 32 and stored within tee coupling 22, transparent bait tube 24 and/or straight bait tube 28. Cap 30 is secured to threaded rod 32 and straight bait tube 28 via wing nut 36. As depicted in FIG. 1, rodent bait system 10 is disposed on the ground and oriented such that the tubular members and connecting joints conform around any tire 42 of the vehicle. Any number of additional rodent bait systems 10 may be secured to other tires of the vehicle in the same manner. Any rodent (not shown) in proximity of the vehicle is attracted to rodent bait system 10. The rodent enters a passageway, such as the end of long entry tube 12 or short entry tube 14, and is directed along the interior path defined by the tubular members and connecting joints until a bait block 78 positioned within tee coupling 22 is reached. As the rodent consumes bait block 78 within tee coupling 22, the other bait blocks positioned above slide down via gravity to provide easy access of the blocks to the rodent or other rodents.

Rodent bait system 10 may have alternative configurations. As depicted in FIGS. 6-7, alternate rodent bait system 44 comprises a plurality of tubular members including alternate long entry tube 48, alternate end tube 52, corner sweep elbows 46, alternate corner tube 54, tee coupling 22 and alternate short entry tube 50. In this configuration, alternate end tube 52 connects adjacent corner sweep elbows 46 together. The housing assembly comprising transparent bait tube 24, bait tube coupling 26, straight bait tube 28 and cap 30 remain the same.

As depicted in FIG. 8, alternate rodent bait system 56 comprises a plurality of tubular members and connecting joints to accommodate multiple tires, which include long entry tube 12, short entry tube 14, corner tube 18, extended entry tubes 58 and tee couplings 22. As depicted in FIG. 9, alternate rodent bait system 60 comprises tubular members and connecting joints such as alternate long entry tubes 48, alternate short entry tube 50, alternate corner tube 54, alternate end tubes 62, corner elbows 20 and tee couplings 22.

Figure 10:
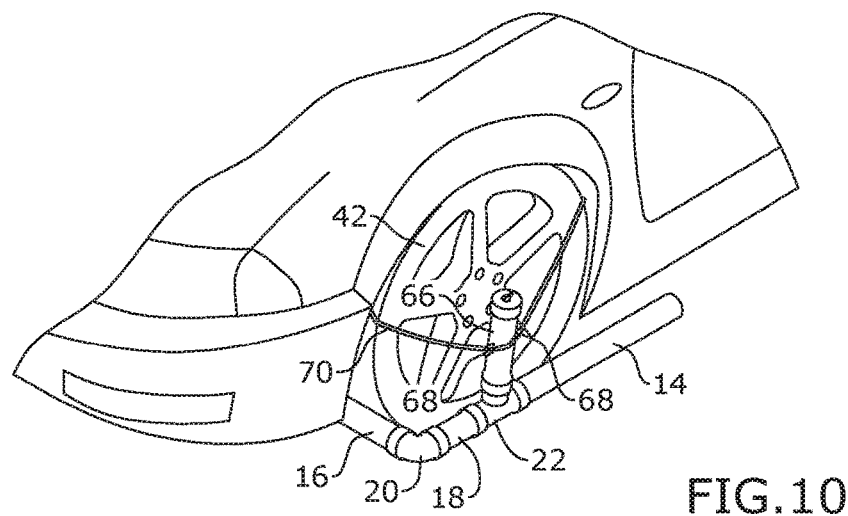
FIG. 10 depicts a perspective view of an alternative embodiment of the rodent bait system shown in use.
Figure 11:
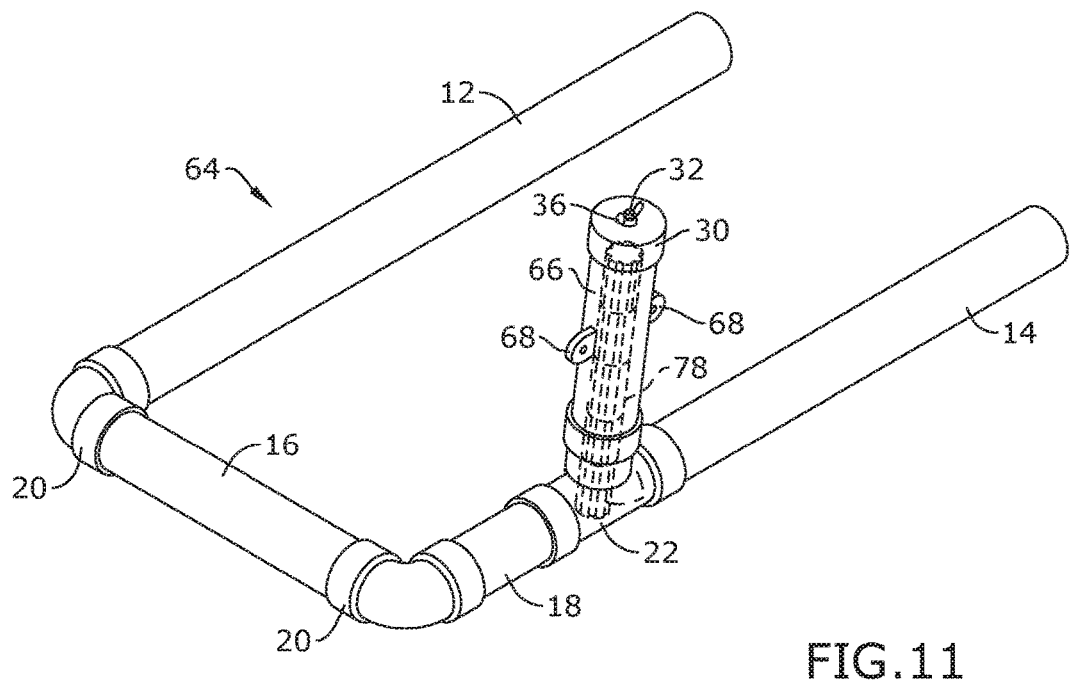
FIG. 11 depicts a perspective view of an alternative embodiment of the rodent bait system.

As depicted in FIGS. 10-11, alternate rodent bait system 64 comprises an alternative housing assembly comprising alternate bait tube 66. Alternate bait tube 66 comprises a pair of tabs 68 positioned on opposing outer side portions of the tube. Each tab 68 comprises an aperture. This permits a user to dispose attachment cord 70 through apertures of tabs 68 and around tire 42 of the vehicle. This helps to secure the rodent bait system to the vehicle. It shall be appreciated that tabs 68 may be used on any tubular housing assemblies of any rodent bait system configurations discussed in this application.

Figure 12:
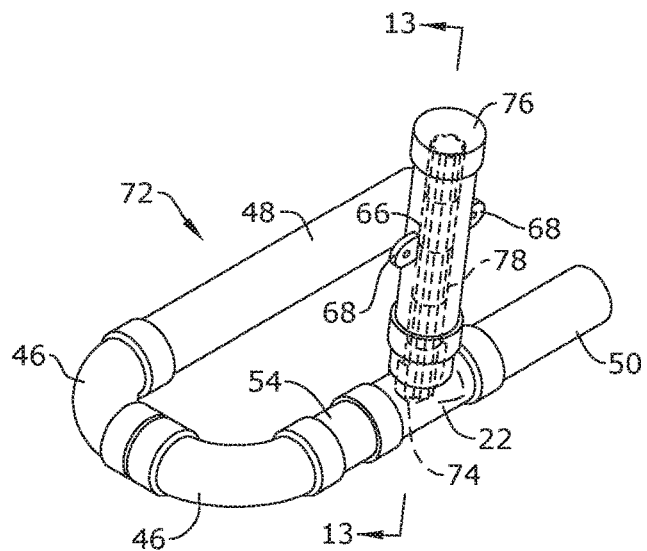
FIG. 12 depicts a perspective view of an alternative embodiment of the rodent bait system.
Figure 13:
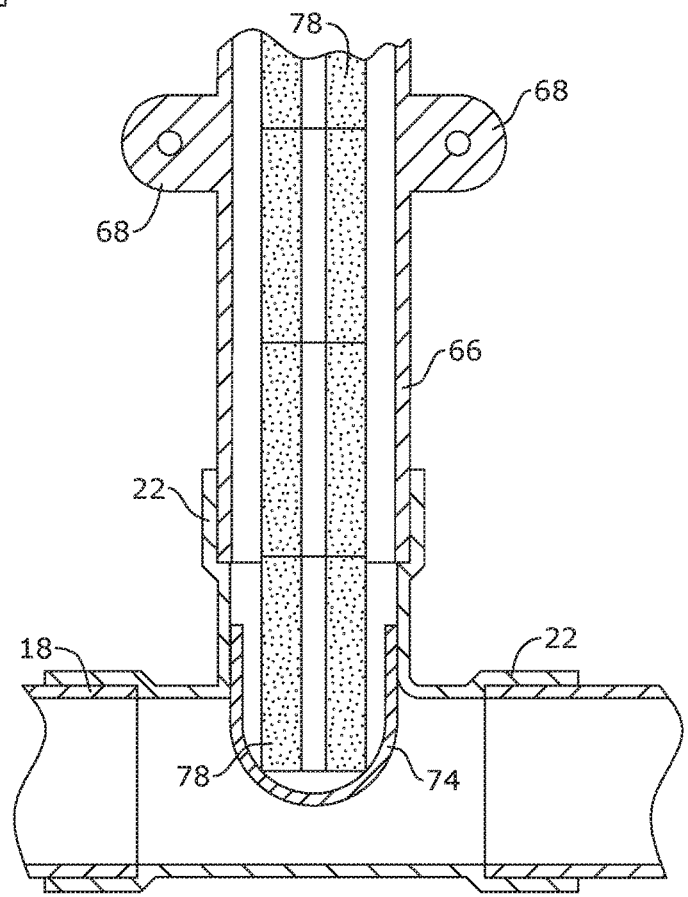
FIG. 13 depicts a section view of certain embodiments of the rodent bait system taken along line 13-13 in FIG. 12.

As depicted in FIGS. 12-13, alternate rodent bait system 72 comprises an alternate housing assembly. In particular, the housing assembly comprises alternate bait tube 66 and alternate cap 76. In this configuration, alternate bait tube 66 comprises a first end coupled to tee coupling 22 and a second end detachably coupled to alternate cap 76. As depicted in FIG. 13, curved bait retainer 74 is coupled to an interior wall of tee coupling 22. Curved bait retainer 74 may have variable shapes, but preferably comprises a U-shaped member. Curved bait retainer 74 is preferably molded with tee coupling 22 as a single component. However, curved bait retainer 74 and tee coupling 22 may also be separate components secured together by mechanical fasteners.

To operate alternate rodent bait system 72, alternate cap 76 is removed to permit a user to dispose a plurality of bait blocks 78 within alternate bait tube 66. The stack of bait blocks 78 are supported by curved bait retainer 74. Any rodents present within the rodent bait system have access to the bait blocks supported by curved retainer 74. As bait blocks are consumed, the remaining bait blocks drop down via gravity to curved bait retainer 74. It shall be appreciated that curved bait retainer 74 may be used in conjunction with any of the different rodent bait system configurations herein. This component replaces the need for using threaded rod 32, wing nut 36 and hex nuts 34.

Figure 14:
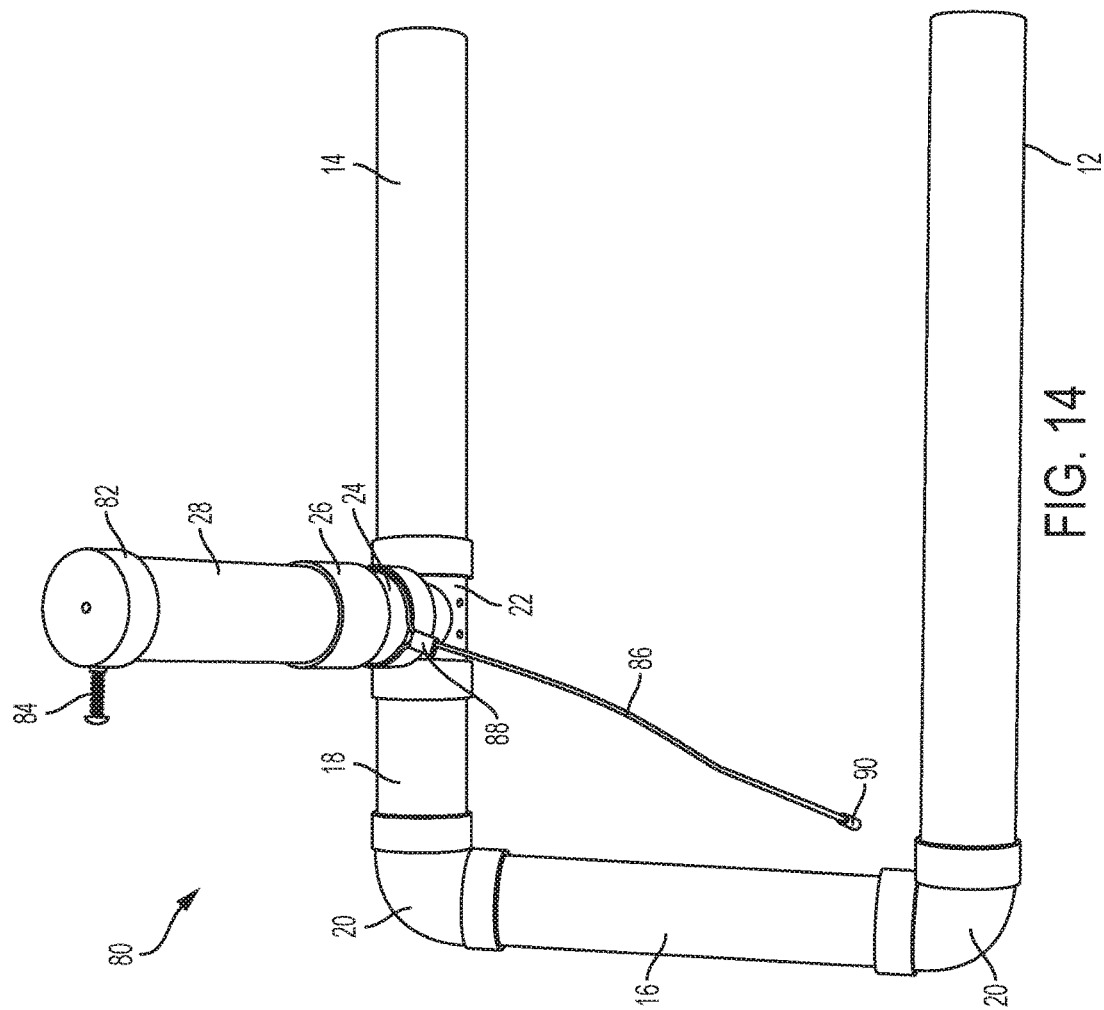
FIG. 14 depicts a perspective view of an alternative embodiment of the rodent bait system.
Figure 15:
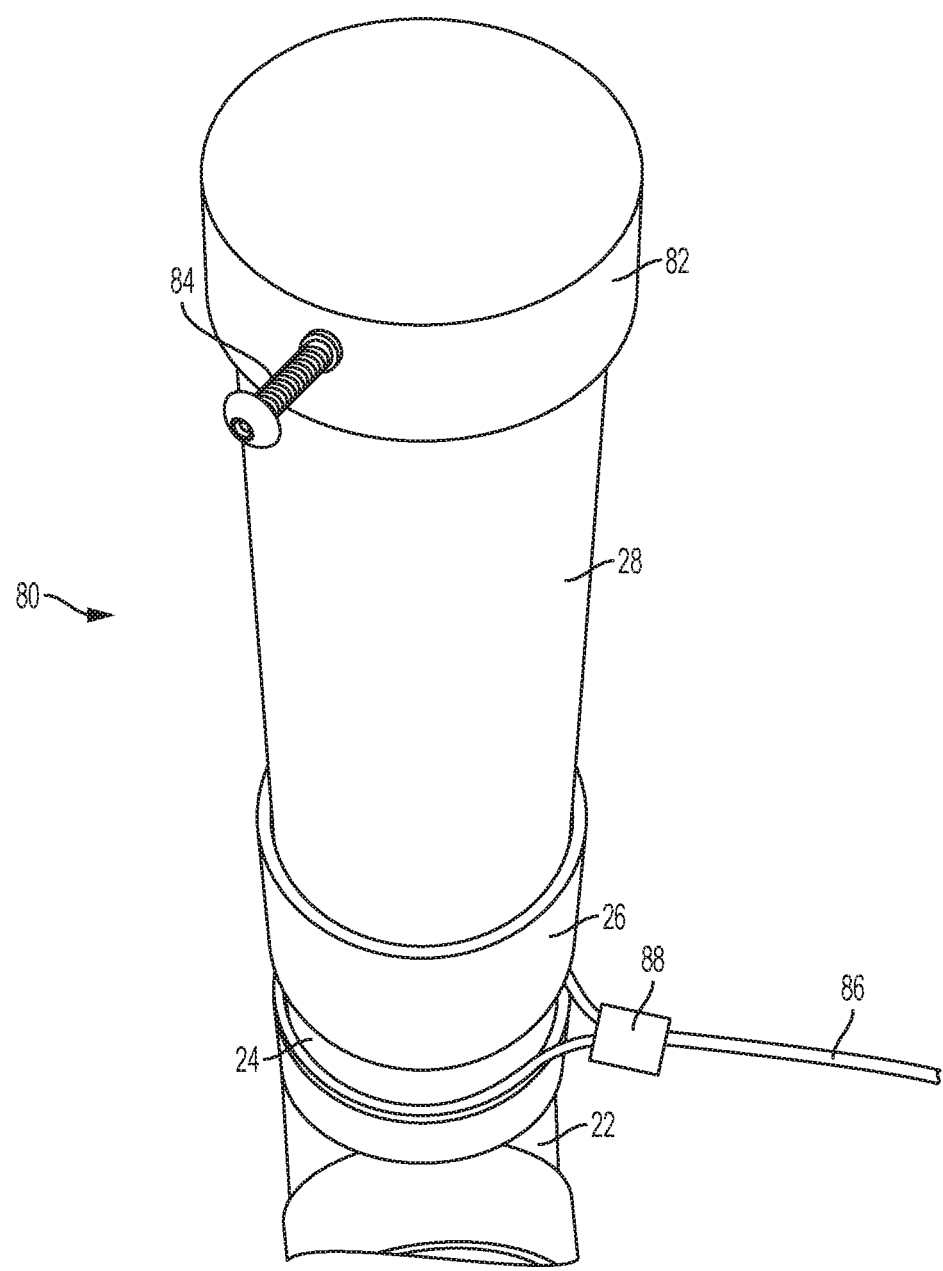
FIG. 15 depicts a perspective view of an alternative embodiment of the rodent bait system.
Figure 16:
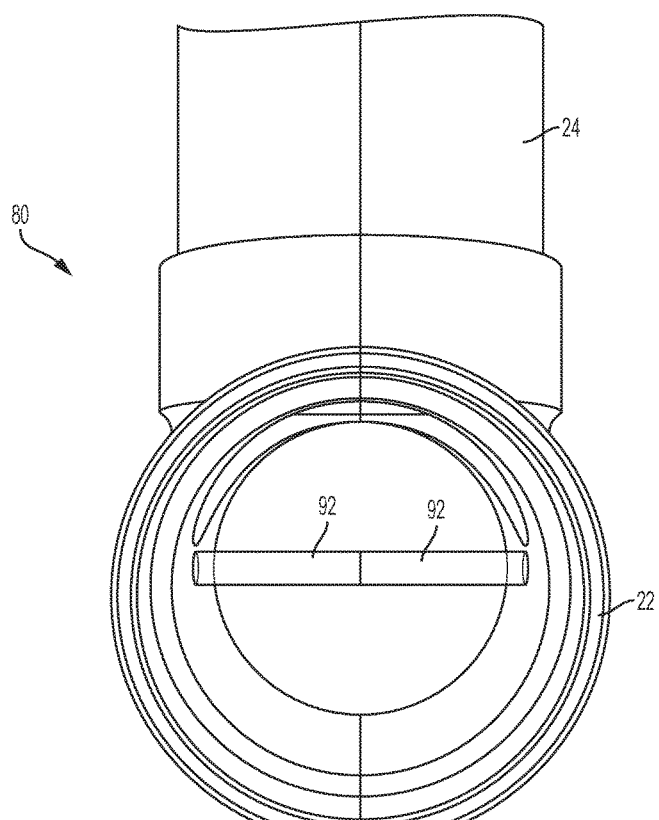
FIG. 16 depicts a section view of an alternative embodiment of the rodent bait system.

As depicted in FIGS. 14-16, alternate diverter system 80 comprises an alternate housing assembly comprising alternate cap 82 detachably coupled to straight bait tube 28, which is coupled to bait tube coupling 26, which is coupled to transparent bait tube 24. In one embodiment, transparent bait tube 24 is coupled to tee coupling 22, which is coupled to a variety of tubular members and connecting joints such as short entry tube 14, corner tube 18, corner elbows 20, end tube 16 and long entry tube 12. However, it shall be appreciated that alternative combinations of tubular members and connecting joints may be coupled to the alternate housing assembly as disclosed in other embodiments of the invention.

As depicted in FIGS. 14-15, high security screw 84 is disposed through an opening in the side of alternate cap 82 and is configured to contact and/or penetrate through a side wall of straight bait tube 28. This permits high security screw 84 to secure alternate cap 82 to straight bait tube 28. In a preferred embodiment, high security screw 84 comprises a length of approximately ½"-¾". It shall be appreciated that a high security screw driver tool (not shown) is required to engage with high security screw 84 to tighten or loosen the screw from alternate cap 82. Aircraft cable 86 is coupled to transparent bait tube 24. Specifically, a first end portion of aircraft cable 86 is disposed around transparent bait tube 24 and secured in place by tube ferrule 88. A second end portion of aircraft cable 86 extends away from transparent bait tube 24 and comprises end ferrule 90. The second end portion of aircraft cable 86 is configured to be disposed beneath tire 42 of the vehicle. The weight of the vehicle transferred to aircraft cable 86 by tire 42 secures alternate diverter system 80 in place. It shall be appreciated that end ferrule 90 serves as a stopper that can be nestled within a tread of tire 42. This further prevents aircraft cable 86 from sliding out of place.

The first end portion of aircraft cable 86 can rotate 360 degrees around transparent bait tube 24, but is retained between bait tube coupling 26 and the top of tee coupling 22. In a preferred embodiment, aircraft cable 86 is a high-tension steel cable with a diameter of approximately ⅛" and a length of approximately 18". However, the dimensions of aircraft cable 86 may vary.

As depicted in FIG. 16, a pair of cylindrical rods 92 is affixed to the interior wall of tee coupling 22, just beneath transparent bait tube 24. Each cylindrical rod 92 comprises a first end hermetically sealed to the interior wall of tee coupling 22 and a second end positioned proximate the other cylindrical rod 92. This orientation aligns the pair of cylindrical rods 92 together. In one embodiment, a spacing of no more than 1/16" exists between the second ends of the pair of cylindrical rods 92. Cylindrical rods 92 may be made from polyurethane, plastic, or other materials known in the field.

As discussed in other embodiments, a plurality of bait blocks can be stacked within straight bait tube 28, bait tube coupling 26 and transparent bait tube 24. The stacked bait blocks extend down within tee coupling 22 and are supported by cylindrical rods 92. In a preferred embodiment, the pair of cylindrical rods 92 is positioned generally in a central portion of tee coupling 22. This permits the rodent to access a bait block in the space above cylindrical rods 92. Space below cylindrical rods 92 permits the rodent to travel beneath the bait block and cylindrical rods 92 when traveling between short entry tube 14 and corner tube 18.

It shall be appreciated that the components of the rodent bait system described in several embodiments herein may comprise any alternative known materials in the field and be of any color, size and/or dimensions. It shall be appreciated that the components of the rodent bait system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A rodent bait system for use with a vehicle to prevent rodents from entering an interior portion of the vehicle, the rodent bait system comprising:
    a base assembly comprising a plurality of tubular members coupled together by connecting joints, the base assembly configured to be disposed on a ground surface and oriented such that the plurality of tubular members and connecting joints conform around at least one tire of the vehicle, the plurality of tubular members comprising at least one entryway for permitting a rodent to enter the base assembly;
    a housing assembly coupled to the base assembly and comprising a plurality of secondary tubular members coupled together, a first end of the secondary tubular members being coupled to a tee coupling of the base assembly and a second end of the secondary tubular members comprising a cap detachably coupled thereto;
    a pair of rods coupled to an interior wall of the tee coupling; and
    a bait member disposed within the housing assembly and supported by the pair of rods, wherein the rodent enters the entryway of the base assembly and is directed along an interior path defined by any number of the tubular members and connecting joints to permit the rodent to access the bait member.

2. The rodent bait system of claim 1, wherein the pair of rods are aligned together, each rod in the pair of rods comprising a first end coupled to the interior wall of the tee coupling and a second end positioned proximate the other rod in the pair of rods.

3. The rodent bait system of claim 2, wherein the pair of rods is configured to support a plurality of bait members stacked together and positioned along a longitudinal axis of the housing assembly.

4. The rodent bait system of claim 3, wherein the pair of rods is oriented such that space above the rods permits the rodent access to one of the supported bait members and space below the rods permits the rodent to travel below the supported bait members.

5. The rodent bait system of claim 4, further comprising a high security screw detachably coupled to the cap and configured to secure the cap to the second end of the secondary tubular members.

6. The rodent bait system of claim 5, further comprising an aircraft cable comprising a first end portion and a second end portion, the first end portion of the aircraft cable coupled to and disposed around one of the plurality of secondary tubular members of the housing assembly, the second end portion of the aircraft cable extending away from the housing assembly and configured to be positioned below the at least one tire of the vehicle.

7. The rodent bait system of claim 6, further comprising a first ferrule coupled to the first end portion of the aircraft cable and a second ferrule coupled to the second end portion of the aircraft cable.

8. The rodent bait system of claim 7, wherein at least one of the secondary tubular members is transparent.

* * * * *